United States Patent [19]
Lee

[11] Patent Number: 5,446,731
[45] Date of Patent: Aug. 29, 1995

[54] SIGNALING CHANNEL DATA TRANSMITTING/RECEIVING CIRCUIT OF A PRIMARY MULTIPLEXER

[75] Inventor: Kyo-Soon Lee, Seoul, Rep. of Korea

[73] Assignee: SamSung Electronics Co., Ltd., Suwon, Rep. of Korea

[21] Appl. No.: 157,450

[22] Filed: Nov. 26, 1993

[30] Foreign Application Priority Data

Nov. 26, 1992 [KR] Rep. of Korea ............... 1992-22459

[51] Int. Cl.6 ............................................ H04J 3/12
[52] U.S. Cl. ..................................... 370/58.2; 370/84; 370/110.1
[58] Field of Search .................. 370/58.1, 68.1, 79, 370/82, 84, 110.1, 58.2; 379/94, 165

[56] References Cited

U.S. PATENT DOCUMENTS

| | | | |
|---|---|---|---|
| 4,002,846 | 1/1977 | Barbier | 370/110.1 X |
| 4,545,052 | 10/1985 | Steierman | 370/68 |
| 4,701,913 | 10/1987 | Nelson | 370/110.1 |
| 4,736,364 | 4/1988 | Basso et al. | 370/68.1 |
| 4,797,654 | 1/1989 | Young et al. | 341/50 |
| 4,953,195 | 8/1990 | Ikemori | 379/33 |
| 5,056,084 | 10/1991 | Le Corre | 370/99 |
| 5,088,089 | 2/1992 | Gingell et al. | 370/67 |
| 5,121,390 | 6/1992 | Farrell et al. | 370/84 X |
| 5,177,738 | 1/1993 | Dell'Oro et al. | 370/84 |
| 5,241,539 | 8/1993 | Obermeier | 370/84 X |

Primary Examiner—Melvin Marcelo
Attorney, Agent, or Firm—Robert E. Bushnell

[57] ABSTRACT

A signaling transmitting/receiving circuit between a primary multiplexer used in an ISDN and an ISDN switching system is disclosed. The signaling transmitting/receiving circuit comprises a frame arrangement unit connected between a transmission line of the primary multiplexer and a thirty-two channel PCM-highway for arranging data within a frame from thirty-two channel data to twenty-four channel data or from twenty-four channel data to thirty-two channel data; a signaling data insertion/extraction circuit having time slot registers accessible to at least one channel data and connected to the frame arrangement unit, for inserting-/extracting data having a time slot width and a channel data rate according to mode assignment into/from the time slot of the PCM-highway corresponding to time slot assigning data stored in the time slot registers in response to signaling control data. The signaling data insertion/extraction circuit is used to either insert signaling data into signaling channel of the PCM-highway, or extract signaling data loaded on channel, in dependence upon the time slot assignment data and signaling control data supplied from a control circuit.

20 Claims, 4 Drawing Sheets

| POSITION | CONTENT FRAME ARRANGEMENT/MAINTENANCE |
|---|---|
| TIME SLOT 1 | B1,1 |
| 2 | B2,1 |
| 3 | B1,2 |
| 4 | B2,2 |
| 5 | D0, C0, D2, C2 |
| 6 | B1,5 |
| 7 | B2,5 |
| 8 | B1,6 |
| 9 | B2,6 |
| 10 | D5, C5, D6, C6 |
| 11 | B1,3 |
| 12 | B2,3 |
| 13 | B1,4 |
| 14 | B1,4 |
| 15 | D3, CV3, D4, C4 |
| 16 | B1,7 |
| 17 | B2,7 |
| 18 | B1,8 |
| 19 | B2,8 |
| 20 | D7, C7, D8, C8 |
| 21 | RESERVED |
| 22 | RESERVED |
| 23 | RESERVED |
| 24 | RESERVED |

SIGNALING CHANNEL DATA TRANSMITTING/RECEIVING CIRCUIT OF A PRIMARY MULTIPLEXER

CROSS-REFERENCE TO RELATED APPLICATIONS

This application makes references to, incorporates the same herein, and claims all benefits incurring under 35 U.S.C. §119 from an application for *Signaling Channel Dam Transmitting/Receiving Circuit Of A Primary Multiplexer* filed in the Korea Industrial Property Office on 26 Nov. 1992 and assigned Ser. No. 1992/22459.

BACKGROUND OF THE INVENTION

1. Technical Field

The present invention relates to a signaling transmitting/receiving circuit of a data multiplexer used in an Integrated Services Digital Network (i.e., ISDN), and more particularly to a signaling transmitting/receiving circuit of a primary multiplexer (i.e., PMUX).

2. Background Art

An ISDN is a communication system in which a single data channel can be used concurrently for multiple communications. The ISDN is a digital switching network or system which provides end-to-end signal connectivity and uses an out-of-band signaling capability. The end-to-end digital connectivity allows signals to enter the network in digital form, transport and then deliver to the subscriber in said digital form. This feature of the ISDN can eliminate the need for a modem which converts the digital signals into analog form for transmission over an analog telephone network. The out-of-band signaling feature allows the signaling information required to administer various communication functions, such as call setup, call monitoring, call waiting tones etc. . . . to be transmitted to the central office switch by a separate signaling channel. This feature of the ISDN can eliminate the need to use channel space in a talk path for administrative purposes. In an ISDN switching network, all signals, whether voice, data, or administrative, are transferred in digital form. There are two types of ISDN communication channels are provided to the subscriber, known as B-channel (i.e., two 64 Kbps channels) and D-channel (i.e., one 16 Kbps channel). B-channel contains voice or data information; and D-channel contains signaling and/or data information. Both the B and D channels are multiplexed to form a single ISDN serial data stream containing subscriber information (voice and data) and subscriber control (signaling) for transmission over a common communication channel. Both B and D channels are bi-directional.

To achieve multiple communications, a narrow band ISDN switching system has a unit accommodating basic access subscribers with primary access subscribers; the unit of accommodating basic access subscribers with primary access subscribers is known as a primary multiplexer (i.e., PMUX). The PMUX multiplexes basic access subscribers as many as the number of primary access links in order to connect the number of basic access subscribers to the ISDN switching system.

The ISDN switching system connected to the PMUX comprises an interface called a BAMI BLOCK. The BAMI BLOCK simply means a constitution of an ISDN switching system connected to a PMUX. A CV-channel is a channel for transmitting/receiving data between the PMUX and the BAMI BLOCK, and signaling data (i.e., CV-channel data) is data transmitted and received through the CV-channel for supporting management functions required for the ISDN switching system. Thus, the interface between the PMUX and the BAMI BLOCK should always maintain the reliability of CV-channel data transmission for inter-communication.

If the ISDN communication service starts, the number of basic access subscribers at remote positions from the ISDN switching system will increase. Accordingly, in order to provide good service for remote subscribers, errorless transmission of CV-channel data having information on layer 1 is required. To assure that the CV-channel data is signaling data transmitted between the PMUX and the BAMI BLOCK as described above, primary digital repeater of a T1 or a E1 type is used to ensure the fidelity of information transmitted between the PMUX and the BAMI BLOCK.

A PMUX can serve several subscribers through a single transmission line. In using that single transmission line, a frame arrangement for respective time slots is provided, and a serial data stream transmitted/received through a PCM-highway.

Conventional signaling channel data transmitting/receiving circuits of a primary multiplexer having the constitution of the BAMI BLOCK within the ISDN switching system have been employed in order to insert the CV-channel data into the CV-channel, or to extract the CV-channel data from the CV-channel. It has been my observation that these conventional circuits are not only extremely complicated to construct, but also require extra hardware for the insertion and extraction of CV-channel data into/from the CV-channel. Moreover, I have noticed that during the extraction of the CV-channel data from the CV-channel, serial data stream continuously received with a short period is scanned, thereby creating a problem of large overhead associated with a program.

SUMMARY OF THE INVENTION

Accordingly, it is one object of the present invention to provide an improved process and circuit for inserting and extracting signaling data.

It is another object to provide a process and a circuit for stably inserting and extracting signaling data of a PMUX in an ISDN switching system.

It is yet another object to provide a circuit for rapidly and accurately inserting/extracting CV-channel data of a PMUX using high-level data link controllers (i.e., HDLC).

These and other objects may be achieved according to the principles of the present invention, with a signaling channel data transmitting/receiving circuit of a PMUX has a frame arrangement unit connected between a transmission line T1 and a thirty-two channel PCM-highway for arranging data within a frame from thirty-two channel data to twenty-four channel data or from twenty-four channel data to thirty-two channel data. Also, a time switch is connected between the thirty-two channel PCM highway and the frame arrangement unit for switching B-channel data in response to a switching control signal. The present invention also has first and second HDLC controllers, interposed between the frame arrangement unit and the time switch, each having a plurality of time slot registers accessible to at least 4 channel data, for inserting/extracting data having a time slot width and a channel data rate according to mode assignments into or from time slots of a PCM-highway corresponding to time slot assigning data stored in said time slot registers. A microprocessor (i.e., MPU) is provided to supply to the time switch the switching control signal in order to control operation of the time switch and to supply operation mode data and time slot assigning data of the first and second HDLC controllers in order to control the insertion/extraction of CV-channel data.

BRIEF DESCRIPTION OF THE DRAWINGS

A more complete appreciation of this invention, and many of the a6ttendant advantages thereof, will be readily apparent as the same becomes better understood by reference to the following detailed description when considerred in conjunction with the accompanying drawings in which like reference symbols indicate the same or similar components, wherein.

DETAILED DESCRIPTION OF THE INVENTION

Figure 1:
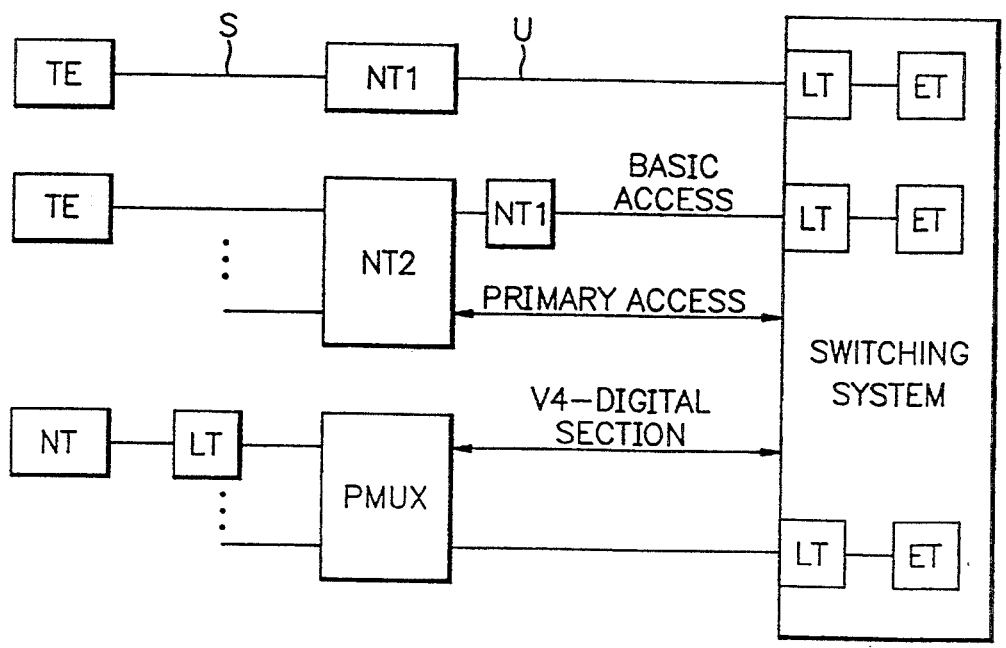
FIG. 1 is a simple diagram of an ISDN switching system.

Turning now to the drawings, to achieve multiple communications, a narrow band ISDN switching system has a unit accommodating basic access subscribers with primary access subscribers as shown in FIG. 1. The unit of accommodating basic access subscribers with primary access subscribers is known as a primary multiplexer (i.e., PMUX). The PMUX multiplexes basic access subscribers as many as the number of primary access links in order to connect the number of basic access subscribers to the ISDN switching system.

In FIG. 1, reference numerals TE, NT1, NT2, LT and ET represent a terminal equipment device TE, a first network termination device NT1, a second network termination device NT2, a line termination device LT, and an exchange termination device ET, respectively.

The ISDN switching system connected to the PMUX comprises a PMUX interface called BAMI BLOCK. The BAMI BLOCK simply means a constitution of an ISDN switching system connected to a PMUX. A CV-channel is a channel for transmitting/receiving data between the PMUX and the BAMI BLOCK, and signaling data (i.e., CV-channel data) is data transmitted and received through the CV-channel. Thus, the interface between the PMUX and the BAMI BLOCK should always maintain the reliability of CV-channel data transmission for inter-communication.

If the ISDN communication service starts, the number of basic access subscribers at remote positions from the ISDN switching system will increase. Accordingly, in order to provide good service for remote subscribers, errorless transmission of CV-channel data having information on layer 1 is required. To assure that the CV-channel data is signaling data transmitted between the PMUX and the BAMI BLOCK as described above, primary digital repeater of a T1 or a E1 type is used to ensure the fidelity of information transmitted between the PMUX and the BAMI BLOCK.

The PMUX as shown in FIG. 1 can serve eight subscribers through a single transmission line T1. In using the single transmission line T1, a frame arrangement for respective time slots is shown in FIG. 2A, and a serial data stream transmitted/received through a PCM-highway is shown in FIG. 2B.

Conventional signaling channel data transmitting/receiving circuits of a primary multiplexer having the constitution of the BAMI BLOCK within the ISDN switching system have been employed in order to insert the CV-channel data into the CV-channel, or to extract the CV-channel data from the CV-channel. I have found however, that these conventional circuits are not only extremely complicated to construct, but also require extra hardware for the insertion and extraction of CV-channel data into/from the CV-channel. Moreover, during the extraction of the CV-channel data from the CV-channel, serial data stream continuously received with a short period is scanned, thereby creating a problem of large overhead associated with a program.

Figure 3:
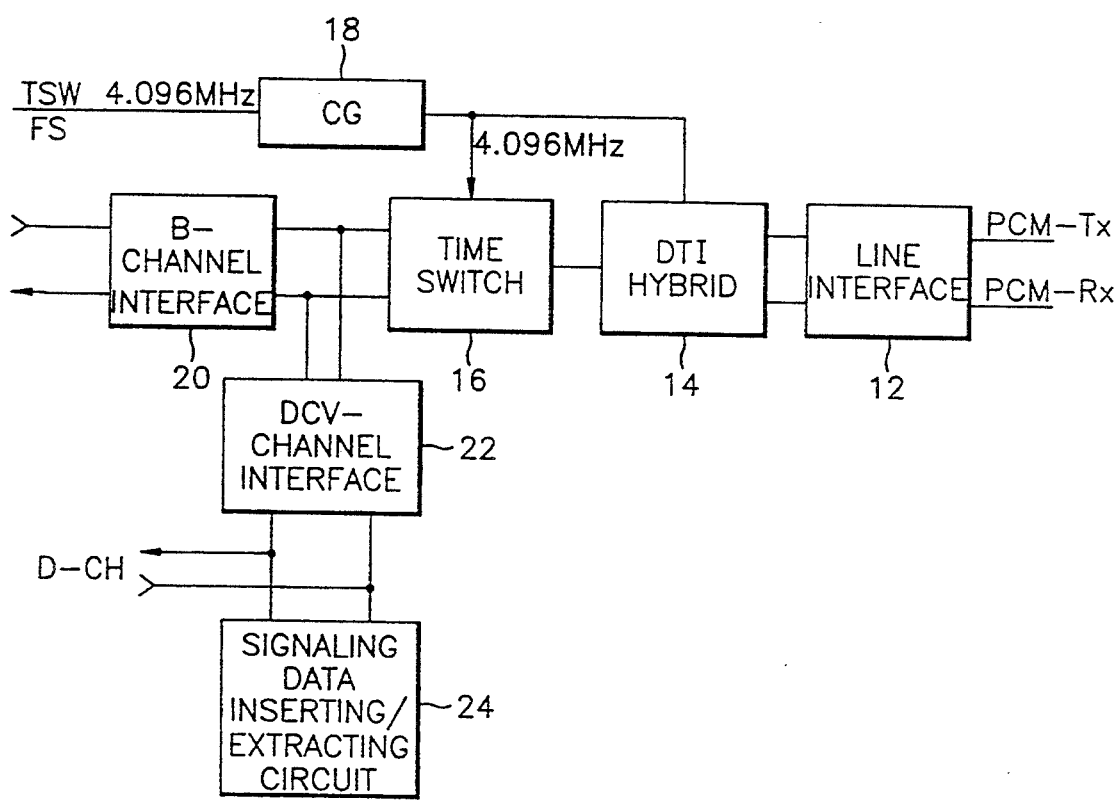
FIG. 3 is a conventional signaling channel data transmitting/receiving circuit of a PMUX.
Figures 2A, 2B:
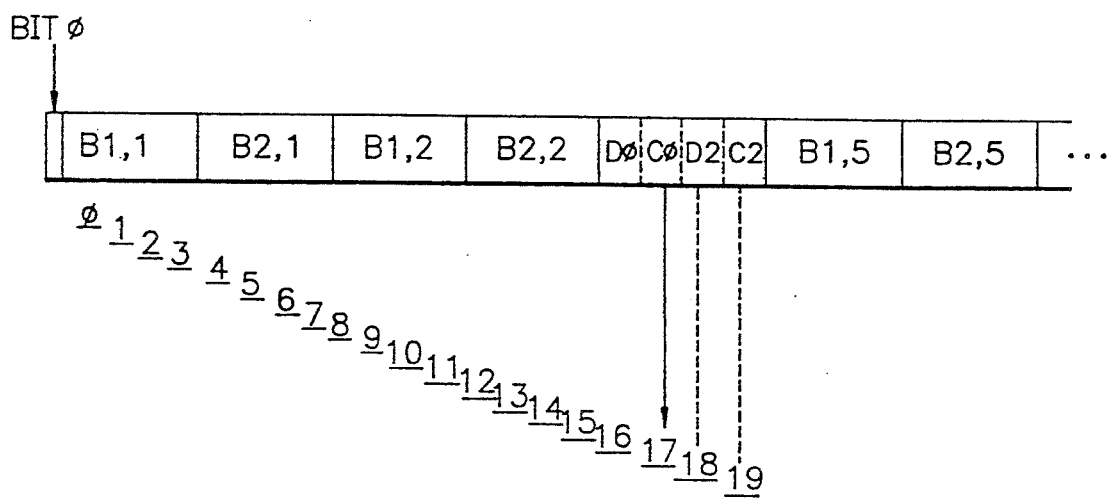
FIGS. 2A and 2B show a table and a data diagram explaining data between a PMUX and an ISDN switching system.

Referring now to FIG. 3 which illustrates a conventional signaling channel data transmitting/receiving circuit of a primary multiplexer used to transmit/receive CV-channel data as shown in FIGS. 2A and 2B. This conventional signaling channel data transmitting/receiving circuit comprises a line interface 12 connected to PCM-transmission/reception terminals (i.e., PCM-Tx/Rx), for arranging data within a frame from 32-channel data to 24-channel data or from 24-channel data to 32-channel data, a DTI hybrid 14 connected to the line interface 12, a B-channel interface 20 for interfacing B-channel data, a time switch 16 connected between the B-channel interface 20 and the DTI hybrid 14, for switching the data, a DCV-channel interface 22 interposed between the time switch 16 and the B-channel interface 20, for interfacing D-channel data and CV-channel data through the time switch 16, and a signaling data inserting/extracting circuit 24 connected to the DCV channel data interface 22, for inserting CV-channel data into the CV-channel and extracting the CV-channel data from the CV-channel.

Here, the data transmitted to, and received from the PMUX connected to the PCM-Tx/Rx terminals is shown in the aforementioned FIGS. 2A and 2B. In FIGS. 2A and 2B, B-channel data is transmitted to, and received from the B-channel interface 20 through the time switch 16 of FIG. 3. The DCV channel data through the time switch 16 is entered to the DCV-channel interface 22. The DCV-channel interface 22 then inserts/extracts D-channel data and CV-channel data by timing of a PCM-highway under the control of the HDLC controller (not shown) and the signaling data inserting/extracting circuit 24, respectively.

Figure 4:
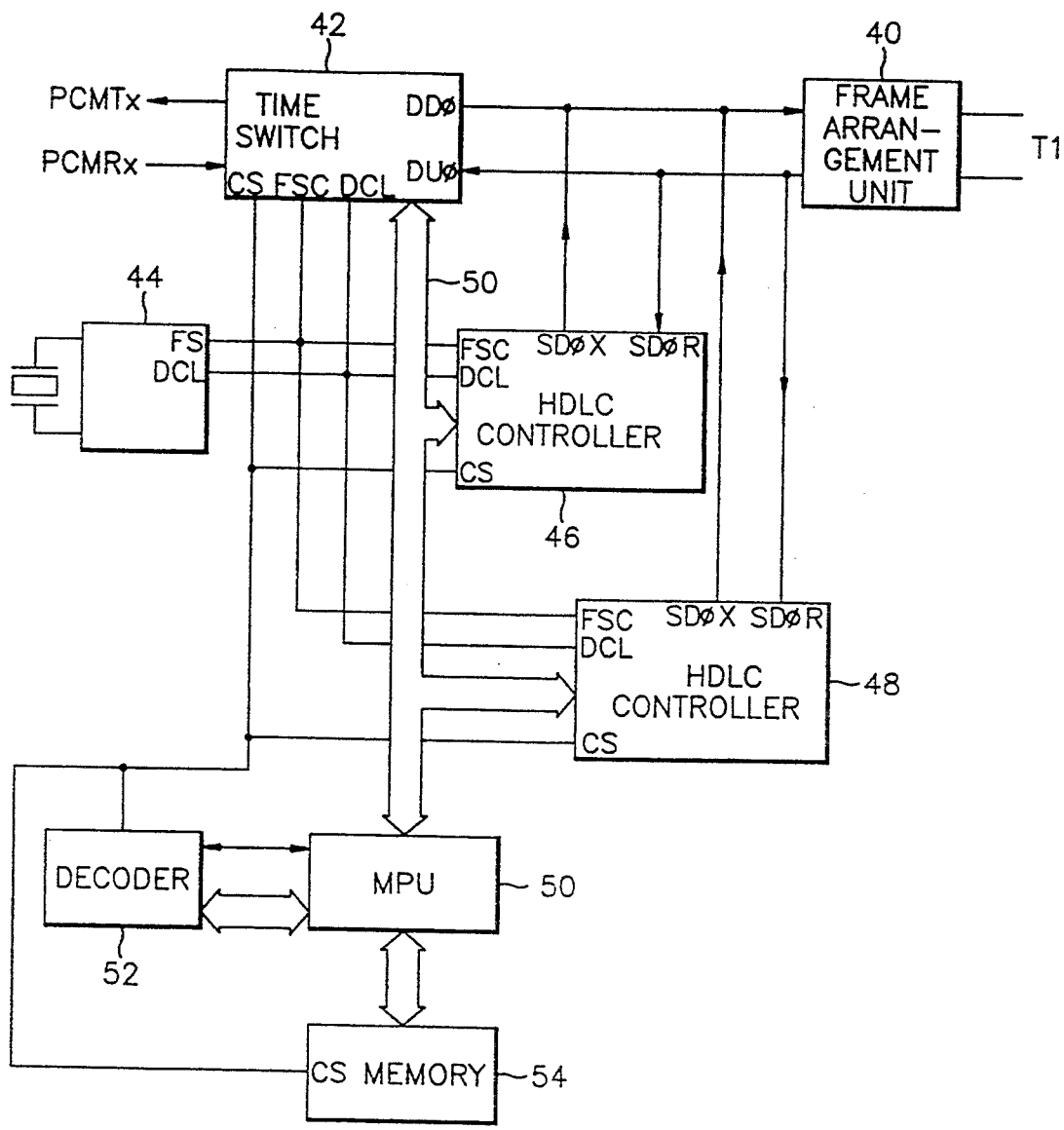
FIG. 4 is a signaling data transmitting/receiving circuit of the PMUX according to the present invention.

FIG. 4 is a circuit diagram illustrating an improved signaling data transmitting/receiving circuit of a primary multiplexer according to the present invention, which has the constitution of the BAMI BLOCK positioned within an ISDN switching system. This circuit comprises a frame arrangement unit 40 connected between a transmission line T1 and a 32-channel PCM-highway (i.e., common bus), for arranging data within a frame from 32-channel data to 24-channel data or from 24-channel data to 32-channel data; a time switch 42 connected between the 32-channel PCM-highway and the frame arrangement unit 40, for switching B-channel data in response to a switching control signal; first ,and second HDLC controllers 46 and 48 each having time slot registers TSR0 to TSR3, connected to the 32-channel PCM-highway and the frame arrangement unit 40, for inserting and extracting data having a time slot width and a channel data rate according to mode assignment into/from time slots of the 32-channel PCM-highway corresponding to time slot assigning data stored in the time slot registers TSR0 to TSR3; and a MPU 50 for controlling the switching of the time switch 42 and controlling the insertion and extraction of CV-channel data by outputting operation node data and time slot assigning data of the first and second HDLC controllers 46 and 48.

In FIG. 4, a reference numeral 44 is a phase-locked-loop (i.e., PLL) having a clock oscillator used to supply a frame synchronizing signal FSC and a data clock DCL to the time switch 42 and the first and second HDLC controllers 46, 48. A reference numeral 52 is a decoder used to decode address/data supplied from the MPU 50 to enable operations of the time switch 56, and the first and second HDLC controllers 46, 48. A reference numeral 54 is a memory comprised of a read-only-memory (i.e., ROM) for storing operation program of the MPU 50 and a random-access-memory (i.e., RAM) for accessing processing data. Here, the transmission line T1 is a data transmitting/receiving path of the PMUX.

In the above description, circuit model PEB2075 of the semiconductor maker SIMENS Corp. is used as the first and second HDLC controllers 46, 48. These HDLC controllers have channels that can process four time slots and are constituted according to mode values recorded in an internal Common Configuration Register (i.e., CCR) as follows:

| Common Configuration Register (CCR) | | |
| --- | --- | --- |
| MDS1 | MDS0 | Mode description |
| 0 | 0 | single connection time slot mode |
| 1 | 1 | Quad connection time slot mode |

Also, each of the first and second HDLC controllers 46 and 48 has a mode register used to determine a time slot width and a channel data rate, and four time slot registers (i.e., TSR) used to store time slot of each channel. The mode register and the TSR are 2 bits and 8 bits long, respectively. The mode according to the states recorded in respective bit regions is as follows. Here, data for assigning time slot is stored in the TSR.

| Mode Register | | | |
| --- | --- | --- | --- |
| MODE | | | |
| CCS1 | CCS0 | Time Slot Width | Channel Data Rate |
| 0 | 0 | 2 bits | 16Kbps |
| 0 | 1 | 1 bits | 8Kbps |
| 1 | 0 | 8 bits | 64Kbps |
| 1 | 1 | 7 bits | 56Kbps |

| Time Slot Register | | | | | | | |
| --- | --- | --- | --- | --- | --- | --- | --- |
| 7 | 6 | 5 | 4 | 3 | 2 | 1 | 0 |
| TSR TS7 | TS6 | TS5 | TS4 | TS3 | TS2 | TS1 | TS0 |

Such first and second HDLC controllers 46, 48 insert/extract CV-channel data into/from the CV-channel multiplexed via 8 channels among the 32 channels of the 32-channel PCM-highway connected between the time switch 42 and the frame arrangement unit 40, under the control of the MPU 50.

If the MPU 50 sets MDS1 and MDS0 of CCR within the first and second HDLC controllers 46, 48 to "00" and sets CCS1 and CCS0 of the mode register to "00", the first and second HDLC controllers 46, 48 are respectively set to single connection time slot mode. The time slot width and channel data rate in each of first and second HDLC controllers 46, 48 which are set to the single connection time slot mode are 2 bits and 16 Kbps, respectively.

Figure 5A:
FIGS. 5A to 5F show timing diagrams of a HDLC controller discussing the operation of FIG. 4.
Figure 5B:
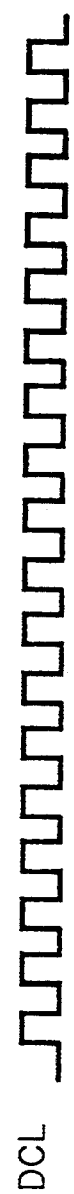
Figure 5C:
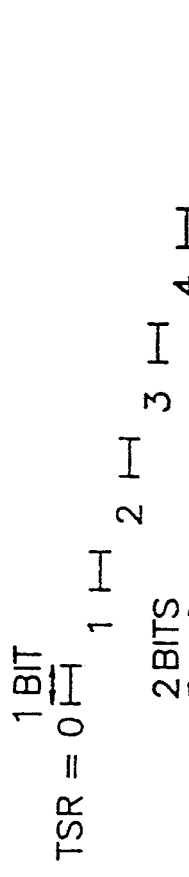

FIGS. 5A through 5F show timing diagrams to explain the operation of FIG. 4 and operation waveform diagrams of the HDLC controllers. FIGS. 5A and 5B show a frame synchronizing signal FSC and a data clock DCL supplied from the PLL 44 of FIG. 4, and the other timing diagrams show channel data rate of an assigned time slot.

Figure 5D:
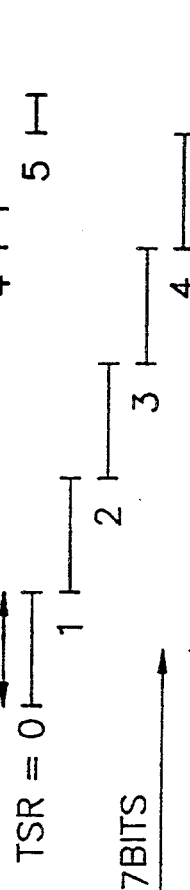
Figure 5E:
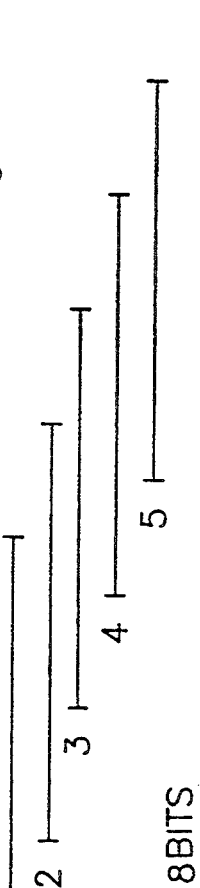
Figure 5F:
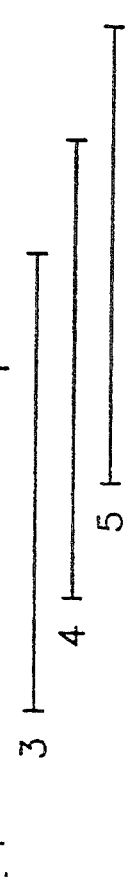

If now the MPU 50 outputs control data to the first and second HDLC controllers 46, 48 through a system bus as described above, each of first and second HDLC controllers 46, 48 sets a time slot mode in response to control data and at the same time, sets a time slot width and a channel data rate. For instance, if the control data is data for setting MDS1 and MDS0 of the CCR within the first and second HDLC controllers 46, 48 and CCS1 and CCS0 of the mode register to "0,0." respectively, each of the HDLC controllers 46 and 48 is set to the single connection time slot mode, and at the same time, its channel rate is set to 16 Kbps as shown in FIG. 5D.

In this state, if the MPU 50 sets the four time slot registers TSR0, TSR1, TSR2 and TSR3 within the first HDLC controller 46 to 17, 19, 37 and 39, respectively, the first HDLC controller 46 accesses and processes CV-channel data in the 17th, 19th, 37th and 39th time slots among signals of the 32-channel PCM-highway entered as a data stream such as shown in FIG. 2B. Similarly, if the four time slot registers TSR0 to TSR3 within the second HDLC controller 48 are respectively set to 56, 59, 77 and 79, the second HDLC controller 48 accesses and processes CV-channel data in the 56th, 59th, 77th and 79th time slots among the signals of the thirty-two channel PCM-highway.

The above access of CV-channel data of the assigned channel represents the recording operation or reading out operation under the control of MPU 50. For instance, in a transmission mode, the first and second HDLC controllers 46 and 48 insert CV-channel data at a channel data rate of 16 Kbps into the channel under the control of the MPU 50. And, in a reception mode, the first and second HDLC controllers 46 and 48 extract CV-channel data received through the above channel under the control of the MPU 50 and then outputs the extracted data.

Each of first and second HDLC controllers 46 and 48 further includes a first-in-first-out (i.e., FIFO) for storing the received CV-channel data. The first and second HDLC controllers 46 and 48 adjust scanning of CV-channel data stored in the internal FIFO under the control of the MPU 50 and process CV-channel using interrupt, thereby reducing overhead caused by the program.

As described above, the present invention rapidly processes CV-channel data in the BAMI BLOCK of an ISDN switching system connected to the PMUX, using the HDLC controller, thereby simplifying hardware and reducing overhead caused by the program in order to accurately transmit/receive CV-channel data.

What is claimed is:

1. In a signaling data transmitting/receiving circuit of an integrated services digital network switching system connected to a primary multiplexer transmitting-/receiving data through a transmission line, the circuit comprising:
   a frame arrangement unit connected between the transmission line and a 32-channel PCM-highway, for arranging data within a frame from 32-channel data to 24-channel data or from 24-channel data to 32-channel data;
   a time switch connected between the 32-channel PCM highway and said frame arrangement unit for switching B-channel data in response to a switching control signal;
   first and second high level data link controllers interposed between said frame arrangement unit and said time switch, each having a plurality of time slot registers accessible to at least 4 channel data, for inserting and extracting CV-channel data representative of signalling data having a time slot width and a channel data rate according to mode assignment data into and from time slots of said 32-channel PCM-highway corresponding to time slot assigning data stored in said time slot registers; and
   a microprocessing unit for supplying to said time switch said switching control signal, for controlling switching of said time switch and supplying said mode assignment data and said time slot assigning data to said first and second high level data link controllers to control the insertion and extraction of said CV-channel data.

2. In a signaling data transmitting/receiving circuit of an integrated services digital network switching system connected to a primary multiplexer, a signaling channel data transmitting/receiving circuit of a primary multiplexer comprising:
   frame arrangement means connected between a transmission line of said primary multiplexer and a 32 channel PCM-highway, for arranging data within a frame from 32-channel data to 24-channel data or from 24-channel data to 32-channel data;
   signaling data insertion/extraction means having a plurality of time slot registers each accessible to at least one channel data, connected to said 32-channel PCM-highway and said frame arrangement means, for inserting and extracting data having a time slot width and a channel data rate according to mode assignment into/from said 32-channel PCM-highway corresponding to time slot assigning data stored in said time slot registers; and
   control means for supplying time slot assigning data and mode assignment data to said signaling data insertion/extraction means to control the insertion and extraction of signaling channel data.

3. A signaling data transmitting/receiving circuit for an ISDN switching system, comprising:
   frame arrangement means coupled to receive ISDN data from one of a transmission line and a common bus, for arranging said ISDN data within a frame, and providing said ISDN data within said frame at corresponding one of said common bus and said transmission line, said ISDN data comprising signaling channel data and B-channel data representative of voice data;
   switch means having a transmission terminal and a reception terminal, connected to said common bus, for enabling selective transmission of B-channel data from said common bus to said transmission terminal and said B-channel data from said reception terminal to said common bus in dependence upon a switch control signal;
   signaling channel data insertion/extraction means interposed between said frame arrangement means and said switch means, and connected to said common bus, for inserting signaling channel data having selected time slot width and channel data rate into said common bus and extracting said signaling channel data from said common bus in accordance with mode assigning data and time slot assigning data; and
   control means for supplying said mode assigning data and said time slot assigning data to control the insertion and extraction of said signaling channel data, and supplying said switch control signal to control the selective transmission of said B-channel data.

4. The signaling data transmitting/receiving circuit as claimed in claim 3, wherein said frame arrangement means arranges said ISDN data with said frame from either 32-channel data to 24-channel data, or from 24-channel data to 32-channel data.

5. The signaling data transmitting/receiving circuit as claimed in claim 3, wherein said signaling channel data insertion/extraction means comprises first and second high-level data link control means each having channels capable of processing four time slots, a mode register for determining said selected time slot width and channel data rate, and four time slot registers for storing time slots for each channel.

6. The signaling data transmitting/receiving circuit as claimed in claim 5, wherein said mode register and each of said four time slot register are 2 bits and 8 bits long, respectively.

7. The signaling data transmitting/receiving circuit as claimed in claim 5, wherein said selected time slot width and channel data rate are 2 bits and 16 Kbps, respectively.

8. The signaling data transmitting/receiving circuit as claimed in claim 3, wherein said signaling channel data insertion/extraction means comprises first and second high-level data link control means operable to insert said signaling channel data at a channel data rate of 16 Kbps into said common bus in a transmission mode, and extract said signaling channel data at said channel data rate of 16 Kbps from said common bus in a reception mode.

9. The signaling data transmitting/receiving circuit as claimed in claim 3, wherein said common bus is a 32-channel PCM-highway.

10. The signaling data transmitting/receiving circuit as claimed in claim 8, further comprised dedoder means for decoding address data from said control means to enable operation of said switch means and said first and second high-level data link control means; and means for providing frame synchronizing signals and data clock signals to enable said first and second high-level data link control means to insert said signaling channel data to said common bus in said transmission mode, and extract said signaling channel data from said common bus in said reception mode.

11. A signaling data transmitting/receiving circuit for a switching system, comprising:
   frame arrangement means for arranging digital data within a frame, and providing said digital data within said frame, said digital data comprising signaling-channel data and user-channel data;

switch means for enabling selective transmission of said user-channel data from said digital data in dependence upon a switch control signal;

signaling channel data insertion/extraction means interposed between said frame arrangement means and said switch means, for inserting signaling-channel data having selected time slot width and channel data rate into said digital data and extracting said signaling-channel data from said digital data in accordance with mode assigning data and time slot assigning data; and control means for supplying said mode assigning data and said time slot assigning data to control the insertion and extraction of said signaling-channel data from said digital data, and supplying said switch control signal to control the selective transmission of said user-channel data.

12. The signaling data transmitting/receiving circuit as claimed in claim 11, wherein said frame arrangement means arranges said digital data with said frame from one of 32-channel data to 24-channel data, and from 24-channel data to 32-channel data.

13. The signaling data transmitting/receiving circuit as claimed in claim 11, wherein said signaling-channel data insertion/extraction means comprises first and second high-level data link control means each having channels capable of processing four time slots, a mode register for determining said selected time slot width and channel data rate, and four time slot registers for storing time slots for each channel.

14. The signaling data transmitting/receiving circuit as claimed in claim 13, wherein said mode register and each of said four time slot register are 2 bits and 8 bits long, respectively.

15. The signaling data transmitting/receiving circuit as claimed in claim 13, wherein said selected time slot width and channel data rate are 2 bits and 16 Kbps, respectively.

16. The signaling data transmitting/receiving circuit as claimed in claim 11, wherein said signaling channel data insertion/extraction means comprises first and second high-level data link control means operable to insert said signaling-channel data at a channel data rate of 16 Kbps into said digital data in a transmission mode, and extract said signaling-channel data at said channel data rate of 16 Kbps from said digital data in a reception mode.

17. The signaling data transmitting/receiving circuit as claimed in claim 11, wherein said digital data is a 32-channel PCM-data for an integrated services digital network.

18. The signaling data transmitting/receiving circuit as claimed in claim 16, further comprised decoder means for decoding address data from said control means to enable operation of said switch means and said first and second high-level data link control means; and means for providing frame synchronizing signals and data clock signals to enable said first and second high-level data link control means to insert said signaling-channel data into said digital data in said transmission mode, and extract said signaling-channel data from said digital data in said reception mode.

19. A signaling data transmitting/receiving circuit for a switching system, comprising:

means for arranging digital data within a frame and providing said digital data within said frame, said digital data comprising signaling-channel data and user-channel data;

means for enabling selective transmission of said user-channel data from said digital data in response to a switch control signal;

first and second high-level data link control means each having channels capable of processing and storing time slots, for inserting signaling-channel data having selected time slot width and channel data rate into said digital data and extracting said signaling-channel data from said digital data in accordance with mode assigning data and time slot assigning data; and controller means for supplying said mode assigning data and said time slot assigning data to control the insertion and extraction of said signaling-channel data from said digital data, and supplying said switch control signal to control the selective transmission of said user-channel data.

20. The signaling data transmitting/receiving circuit as claimed in claim 19, wherein said digital data is a 32-channel PCM-data for an integrated services digital network, said arranging means arranges said digital data with said frame from one of 32-channel data to 24-channel data, and from 24-channel data to 32-channel data.

* * * * *